United States Patent [19]

Roehling et al.

[11] 3,845,300

[45] Oct. 29, 1974

[54] APPARATUS AND METHOD FOR MAGNETOPLASMADYNAMIC ISOTOPE SEPARATION

[75] Inventors: Duane J. Roehling; David B. Fradkin, both of Los Alamos, N. Mex.

[73] Assignee: The United States of America as represented by the United States Atomic Energy Commission, Washington, D.C.

[22] Filed: Apr. 18, 1973

[21] Appl. No.: 352,380

[52] U.S. Cl.................... 250/282, 250/294, 313/63
[51] Int. Cl............................................ B01d 59/44
[58] Field of Search...... 313/63; 250/281, 282, 283, 250/284, 294, 295, 298

[56] References Cited
UNITED STATES PATENTS

| | | | |
|---|---|---|---|
| 2,978,580 | 4/1961 | Ardenne | 250/282 |
| 3,315,125 | 4/1967 | Frölich | 313/63 |
| 3,326,769 | 6/1967 | Neidigh | 313/63 |
| 3,329,864 | 7/1967 | Michel | 313/63 |
| 3,363,124 | 1/1968 | Bensussan | 313/63 |
| 3,372,296 | 3/1968 | Naff | 313/63 |
| 3,546,513 | 3/1968 | Henning | 313/63 |
| 3,617,908 | 11/1971 | Greber | 313/63 |
| 3,643,123 | 2/1972 | Haeff | 313/63 |
| 3,702,416 | 11/1972 | Bex | 313/63 |
| 3,740,554 | 6/1973 | Morgan | 313/63 |

*Primary Examiner*—James W. Lawrence
*Assistant Examiner*—D. C. Nelms
*Attorney, Agent, or Firm*—John A. Horan; Paul D. Gaetjens; Robert W. Weig

[57] ABSTRACT

An apparatus and method for the separation of at least two isotopes present in a vaporized element. A vaporized element comprising at least two isotopes enters the smaller end of a diverging tubular magnetic field through an annular cathode. The vapor is ionized by an electrical discharge between the annular cathode and the annular anode. Because of the interaction of the radial component of the magnetic field, the particles accelerate to high rotational velocities. The particles are subsequently accelerated downstream by expansion in the diverging magnetic field in accordance with the principles of Conservation of Angular Momentum and Total Energy. Differences in the angular momentum of the isotopes cause heavier isotopes of the element to diverge more than lighter isotopes. The isotopes therefore condense on a relatively cool receiving element at concentrations dependent on the flow distance from the center of the magnetic field. A second embodiment comprises a magnetic bottle with a converging field downstream which provides a radial compression resulting in an additional centrifuging of the plasma prior to collection.

6 Claims, 3 Drawing Figures

APPARATUS AND METHOD FOR MAGNETOPLASMADYNAMIC ISOTOPE SEPARATION

The invention described herein was made in the course of, or under, a contract with the U.S. Atomic Energy Commission.

FIELD OF THE INVENTION

The invention relates to isotope separation and more particularly to an apparatus and method for magnetoplasmadynamic isotope separation.

BACKGROUND OF THE INVENTION

One prior art plasma generating unit is a homopolar device which has several drawbacks. Any isotope collection must be made in the vicinity of the plasma producing electric arc. Thus, one runs the possibility of undesirable interaction with the arc. In addition, plasma temperatures in the vicinity of the arc are very high, making sample collection there difficult. Contamination from the walls of the container is also a problem. Too, the device, to operate, must be pulsed and the chamber must be evacuated between pulses. Thus, the operation cannot be carried on continuously, which naturally cuts down mass flow per unit time.

SUMMARY OF THE INVENTION

The invention relates to an apparatus and method for magnetoplasmadynamic isotope separation. Within a diverging tubular magnetic field capable of containing the plasma, there is provided at the smaller end thereof, an annular cathode and an annular anode, respectively, aligned so that a vaporized element comprising at least two isotopes can be injected therethrough. Disposed downstream from the anode, at the wider end of the magnetic field, is a cooled receiving element. In passing through the electrical discharge between the annular cathode and the annular anode, the vaporized element becomes ionized. Because charge neutrality is maintained, the ionized element constitutes a plasma. The interaction between the radial component of the current density and the axial component of the applied magnetic field causes the ions to rotate. Because of differences in angular momentum between heavier and lighter isotopes of the same element, the heavier plasma particles diverge a greater amount within the magnetic field and come to rest toward the ends of the receiving element to effect an isotope redistribution. A second embodiment comprises a magnetic bottle having a converging magnetic field downstream which converts axial kinetic energy back into rotational energy, thereby providing a greater degree of centrifugal separation than the embodiment incorporating the diverging tubular magnet field.

One object of the present invention is to provide isotope separation.

Another object of the invention is to provide magnetoplasmadynamic isotope separation.

Still another object of the invention is to provide a steady state magnetoplasmadynamic isotope separation.

One advantage of the present invention is that the apparatus thereof provides continuous, contaminant-free isotope separation.

Another advantage of the present invention is that the vaporized isotopes reach the high temperature plasma state well downstream from material parts of the apparatus, thereby providing a broad selection of materials from which these elements can be constructed.

BRIEF DESCRIPTION OF THE DRAWINGS

Other objects and advantages of the present invention will be apparent to those skilled in the art from the following description with reference to the appended drawings wherein like numbers denote like parts and wherein.

DETAILED DESCRIPTION OF THE INVENTION

Figure 1:
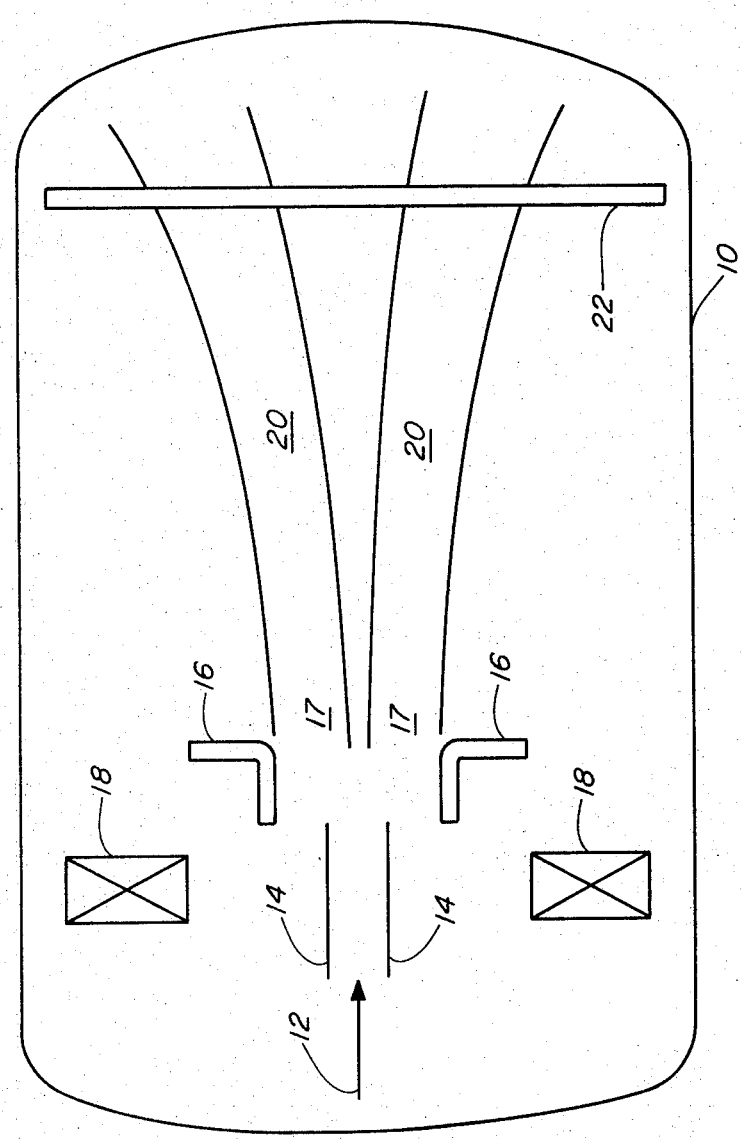
FIG. 1 schematically represents a first embodiment of the invention.

Reference is now made to FIG. 1 which shows one embodiment of the invention. A suitably evacuatable vacuum vessel 10 supplies an environment into which a vaporized element having a predetermined isotope distribution comprising at least two isotopes to be separated is introduced. The vaporized element, injected in the direction indicated by arrow 12, passes through an annular cathode 14 and an annular anode 16. A tubular magnetic field produced by an annular electromagnetic means 18, through electromagnetic interaction with the ionized particles of the now gaseous element, spins the plasma 20 in an area 17 just forward of anode 16. Because of the principles of Conservation of Angular Momentum and Total Energy, the plasma 20 accelerates downstream into the vicinity of a receiving element 22 such as a water-cooled stainless steel tube or plate which collects the isotopes of the element on its surface. Other types of collecting elements such as chemical traps may also be used. Because of the differences in angular momentum, isotope redistribution is effected over element 22, with the heavier isotopes being concentrated away from the center of the element and the lighter isotopes being concentrated more toward the center of the element.

The magnetic flux tube contains the plasma emerging through anode 16. Long downstream current extension occurs. Plasma rotational velocities induced by interaction between the radial current flow and the axial component of the magnetic field are on the order of $10^6$ cm/sec. The conversion of plasma rotational energy into axially directed kinetic energy accelerates the plasma downstream from the cathode. The centrifugal force caused by the high plasma rotational velocities developed during the acceleration process drives the heavier particles to the outer regions and the lighter particles to the inner region of the plasma beam to effect isotope separation. Thus, with $^6$Li and $^7$Li, for example, the $^7$Li concentration is greater toward the ends or outside regions of receiving element 22 whereas the $^6$Li concentration is greater toward the center of element 22.

The anode 16 can comprise an outer tantalum radiator brazed to a tantalum cylinder. The cathode 14 can comprise a hollow tungsten tube on a tantalum support structure brazed onto the vaporizer (not shown) which emits the vaporized element entering the system along arrow 12. The anode 16 can have a 3.75 cm inside diameter (i.d.), be 3.9 cm long, and have a 9.1 cm outside diameter (o.d.) at its largest section. The hollow cathode can have a 1.1 cm i.d., 1.9 cm o.d., and be 3.7 cm long. Such a hollow cathode provides a very stable discharge so that no insulators are required in the region of the arc. Electromagnetic element 18 may be a solenoidal electromagnet disposed 15 cm upstream from the electrode region. Such an electromagnet provides an essentially axial magnetic field near the arc electrodes 14 and 16, and a slowly diverging magnetic field downstream therefrom. The arc assembly can be mounted in the end of a 90 cm diameter by 150 cm long stainless steel vacuum chamber (10). An exemplary lithium vaporizer and an arc producing apparatus suitable for use in practicing the invention is described in detail by the inventors herein, D. J. Roehling and D. B. Fradkin, et al., in "Experiments Using a 25-kW Hollow Cathode Lithium Vapor MPD Arcjet", AIAA Journal, Vol. 8, No. 5, May 1970, pp. 886–894.

A 25 kilowatt (kW), lithium fueled, applied field magnetoplasmadynamic (MPD) arcjet can be used with the above assembly. One preferably operates the arc at currents within the range of from about 250 to about 500 amps, but can run it at up to about 1,200 amps; voltages of about 40 to about 60 volts, but can run it at voltages up to about 70 volts; and at magnetic field strengths of from about 500 to about 3,000 gauss. With lithium, about 70 percent of the input electrical power is transported in the highly ionized beam. Vacuum vessel 10 is evacuated to from about $1 \times 10^{-6}$ Torr to as low as about $2 \times 10^{-7}$ Torr.

Measurements show that about 25 cm downstream from the arc head, lithium ion velocity exceeds $2 \times 10^6$ cm/sec. Ninety centimeters downstream, the lithium plasma may have a temperature of on the order of 2.3 ev and a density of about $1.5 \times 10^{12}$ cm$^{-3}$. The apparatus can be operated so that more than 40 percent of the arc current extends 90 cm downstream of the arc head.

TEST

Figure 2:
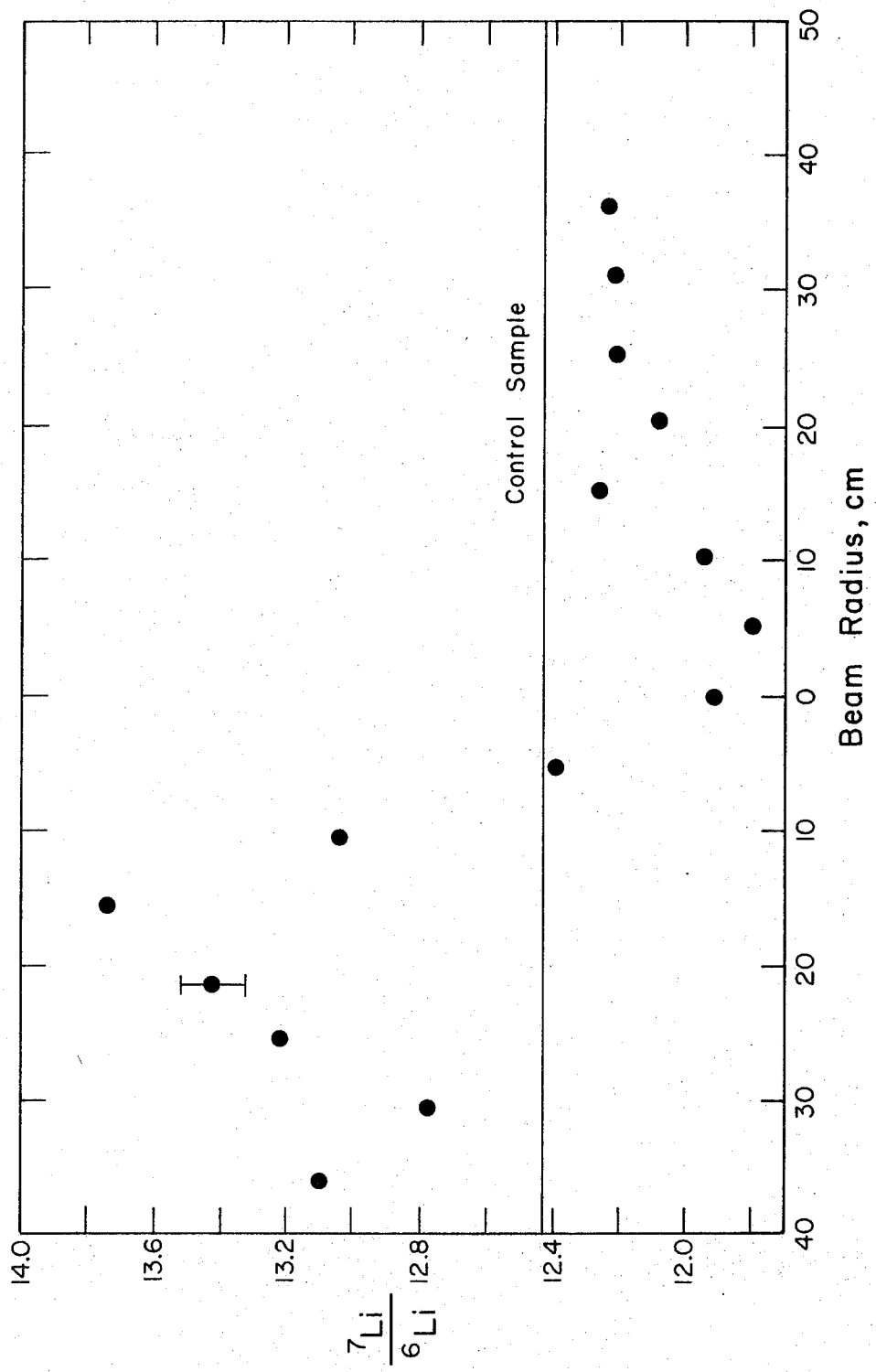
FIG. 2 is a graphical representation of an actual experimental isotope redistribution ratio for $^6$Li and $^7$Li.

A lithium-fueled MPD arcjet separates $^6$Li and $^7$Li. A water cooled rod was used as the receiving element 22, 91 cm downstream from arc anode 16. Samples of condensed lithium were taken and isotopic analysis was performed at Oak Ridge National Laboratory (ORNL). Results for the separation of $^6$Li and $^7$Li, obtained with the arc running at a 410 amp current level, an 800 Gauss magnetic field strength at the anode, and a lithium input flow rate of 27.5 milligram per second (mg/sec) are shown in FIG. 2. ORNL reports an accuracy of ±1 percent for the isotope ratios. The control sample line represents the isotope ratio of a sample of lithium taken prior to being fed through the arc.

Figure 3:
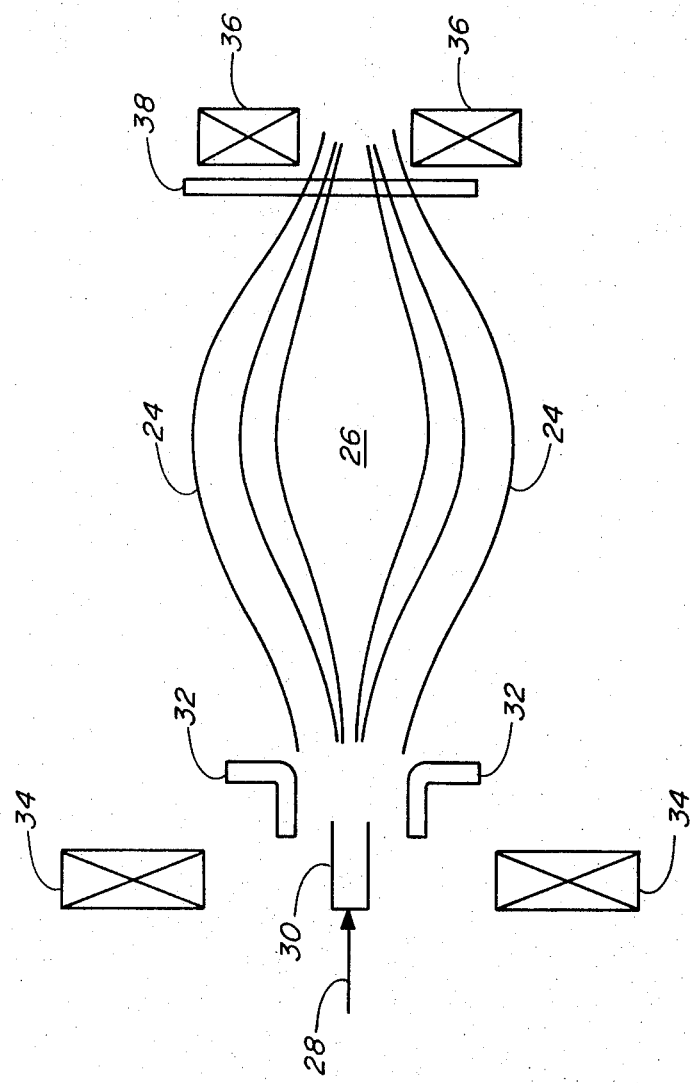
FIG. 3 shows a schematic representation of a second embodiment of the invention.

FIG. 3 shows an embodiment of the invention providing a downstream magnet to form a magnetic bottle for reconverting the axial energy of the plasma particles into rotational energy. This additional centrifuge effect causes further isotope separation and slows down the particles to facilitate easier isotope collection.

Particles of the vaporized element comprising at least two isotopes, are introduced along arrow 28 through a cathode 30 and an anode 32 into a magnetic bottle 24 provided by electromagnets 34 and 36. Because the magnetic field expands immediately downstream from anode 32, the particles' rotational energy converts to axial energy, accelerating the particles in an area 26. Centrifugal force drives the heavier isotopes toward the walls of magnetic bottle 24. Further downstream, the magnetic field created by electromagnets 36 converges and deaccelerates the plasma particles, rendering them relatively cool and easy to collect on a receiving element 38, similar to element 22 of FIG. 1. The converging magnetic field of the FIG. 3 embodiment provides an additional centrifuge effect yielding further isotope separation.

Any elements which are chemically compatible so as not to interact with the anode or cathode at the temperatures reached in the region thereof may be run through the magnetoplasmadynamic isotope separator of the invention. Anodes and cathodes can be constructed from refractory metals or carbides chemically compatible with the vaporized elements to be run. Naturally, the cooler the anode and cathode are run, the better, since the higher the operating temperature, the more likely and rapidly chemical interactions between the vaporized element and the electrodes are to take place. The anode can be water cooled to increase the rate of operation of the apparatus.

It will be appreciated that the magnetic field through which the plasma passes spins the particles at much higher velocities than those attainable mechanically to create greater isotope separation for collection. Too, the magnetic tube or bottle created by electromagnets 18 contains and keeps the plasma free of contaminants because the plasma cannot contact the walls of vessel 10. In addition, the plasma acceleration occurs downstream from the electrical discharge to make collection of isotopes comparatively easy because the plasma is cooler there than near the arc head. Homopolar devices cannot offer this advantage, collection being difficult near the arc head as required therein. Homopolar devices require walls for plasma containment which leads to wall material contamination of the isotopes collected.

The apparatus of the invention offers steady state operation which provides greater mass flow per unit time than the pulsed devices of the prior art. The invention achieves about a 6 percent isotope redistribution per run, or enrichment with Li$_6$ and Li$_7$; and should achieve about 1 percent isotope enrichment per run with U$_{235}$ and U$_{238}$.

The invention has been described in detail with particular reference to preferred embodiments thereof, but it will be understood that variations and modifications can be effected within the spirit and scope of the invention.

What is claimed is:

1. An apparatus for separating at least two of the isotopes of a vaporized element comprising a predetermined distribution of said isotopes, the apparatus comprising:

an annular anode and an annular cathode having a common axis of rotation, said anode and cathode being spaced from one another along said axis;

means for producing a tubular magnetic field concentric about and enclosing said anode and said cathode;

means for introducing said vaporized isotopes substantially parallel to said axis, through said annular anode and said annular cathode, respectively, so that said particles are accelerated, entering the plasma state downstream from said anode and cathode; and means for collecting said isotopes from the plasma state comprising an isotope distribution different from said predetermined isotope distribution.

2. The invention of claim 1 wherein said magnetic field producing means produces a magnetic field about said anode and cathode which diverges downstream from said cathode.

3. The invention of claim 1 wherein said magnetic field producing means produces a magnetic field about said anode and cathode, which first diverges and then converges downstream from said cathode.

4. A method for separating at least two isotopes of a vaporized element comprising a predetermined isotope distribution, the method comprising the steps of:

providing about an axis a tubular magnetic field capable of containing the element in a plasma state;

generating about the axis and within the magnetic field an electric field having at least radial and axial components;

introducing the element in vaporized form within the magnetic field substantially parallel to the axis, and into the electric field, which accelerates the particles of the vaporized element and causes them to enter the plasma state; and collecting the isotopes of the element in at least two portions to retain the element in at least two masses having isotope distributions different from the predetermined distribution.

5. The invention of claim 4 wherein the tubular magnetic field is divergent downstream of the annular negative field.

6. The invention of claim 4 wherein the tubular magnetic field downstream from the annular negative field is first divergent and then convergent.

* * * * *